US012473903B2

(12) United States Patent
Volsmann et al.

(10) Patent No.: US 12,473,903 B2
(45) Date of Patent: Nov. 18, 2025

(54) LEAK DETECTION FROM DIAPHRAGM COMPRESSOR

(71) Applicant: Cavendish Hydrogen A/S, Herning (DK)

(72) Inventors: Jørgen Ole Volsmann, Ikast (DK); Joshua Andrew Adams, Woodbridge, CT (US); Lars Toft Stampe, Viborg (DK)

(73) Assignee: CAVENDISH HYDROGEN A/S, Herning (DK)

( * ) Notice: Subject to any disclaimer, the term of this patent is extended or adjusted under 35 U.S.C. 154(b) by 286 days.

(21) Appl. No.: 18/012,347

(22) PCT Filed: Jun. 22, 2021

(86) PCT No.: PCT/DK2021/050200
§ 371 (c)(1),
(2) Date: Dec. 22, 2022

(87) PCT Pub. No.: WO2022/002326
PCT Pub. Date: Jan. 6, 2022

(65) Prior Publication Data
US 2023/0250815 A1    Aug. 10, 2023

(30) Foreign Application Priority Data

Jun. 30, 2020   (DK) ................................ 2020 70435

(51) Int. Cl.
*F04B 43/00*    (2006.01)
*F04B 43/02*    (2006.01)
(Continued)

(52) U.S. Cl.
CPC ........ *F04B 43/0054* (2013.01); *F04B 43/009* (2013.01); *F04B 45/0533* (2013.01);
(Continued)

(58) Field of Classification Search
CPC .... F04B 43/0054; F04B 43/009; F04B 43/02; F04B 45/0533; F04B 49/02; F04B 2201/0803; F04B 2205/06
See application file for complete search history.

(56) References Cited

U.S. PATENT DOCUMENTS

| 1,332,806 A | 3/1920 | Corblin |
| 2,662,478 A | 12/1953 | Surre |

(Continued)

FOREIGN PATENT DOCUMENTS

| CN | 110529370 A | 12/2019 |
| EP | 1418366 A1 | 5/2004 |

(Continued)

OTHER PUBLICATIONS

International Search Report for corresponding application PCT/DK2021/050200 filed Jun. 22, 2021; Mail dated Aug. 5, 2021.

(Continued)

*Primary Examiner* — Charles G Freay
(74) *Attorney, Agent, or Firm* — CANTOR COLBURN LLP

(57) ABSTRACT

A diaphragm compressor having a compressor head with a hydraulic fluid plate having a fluid plate contact plane and a process fluid plate having a process plate contact plane, the plates forming a compression chamber when contact therebetween is established, the compression chamber being divided in an upper chamber and a lower chamber by a multi-layered diaphragm, where a controller is configured for controlling an alternating movement of the multi-layered diaphragm towards the upper and the lower chambers respectively, a process fluid plate seal is positioned in a process fluid seal groove provided in the contact plane, the process fluid plate seal forms a process fluid seal between an upper side of the multi-layered diaphragm and the contact plane, and the process fluid plate includes a process fluid (Continued)

leak groove system fluidly connected to a process fluid plate leakage passage provided in the process fluid plate.

18 Claims, 4 Drawing Sheets

(51) Int. Cl.
  *F04B 45/053* (2006.01)
  *F04B 49/02* (2006.01)
(52) U.S. Cl.
  CPC .............. *F04B 43/02* (2013.01); *F04B 49/02* (2013.01); *F04B 2201/0803* (2013.01); *F04B 2205/06* (2013.01)

(56) References Cited

U.S. PATENT DOCUMENTS

| | | | |
|---|---|---|---|
| 3,105,442 A | 10/1963 | Howerton | |
| 3,605,566 A * | 9/1971 | Vetter | F04B 43/009 417/63 |
| 3,661,060 A | 5/1972 | Bowen | |
| 5,501,577 A | 3/1996 | Cornell | |
| 5,860,793 A | 1/1999 | Muscarella | |
| 5,983,777 A * | 11/1999 | Cassaday | F04B 43/0063 92/97 |
| 6,790,014 B2 * | 9/2004 | Bowen | F04B 53/08 92/96 |
| 2018/0135616 A1 * | 5/2018 | Adams | F04B 43/009 |

FOREIGN PATENT DOCUMENTS

| | | |
|---|---|---|
| FR | 2764334 A1 | 12/1998 |
| JP | 2009097415 A | 5/2009 |

OTHER PUBLICATIONS

Written Opinion for corresponding application PCT/DK2021/050200 filed Jun. 22, 2021; Mail dated Aug. 5, 2021.

* cited by examiner

LEAK DETECTION FROM DIAPHRAGM COMPRESSOR

TECHNICAL FIELD

The disclosure relates to a diaphragm compressor having a multi-layered diaphragm having means for detection gas and oil leaks and to a method of detection of oil and gas leaks from a diaphragm compressor.

BACKGROUND

Leakage detection from multi-layered diaphragm compressors is known in the art e.g. from Chinese patent application No. CN110529370, French patent application No. FR2764344 and U.S. Pat. No. 5,501,577. As described therein, either gas leaks or a mix om leaking working fluid and "gas fluid" are detected. Based on a sensor measurement of the amount of leaked gas or mixed "gas fluid" and working fluid a controller may stop the operation of the diaphragm compressor. However, no prior art leakage detection systems describe how to continue detecting leakage if e.g. the sensor fails or how to determine the amount of leaked gas in the mix of leaked working fluid and "gas fluid".

BRIEF SUMMARY

The present disclosure addresses the deficiencies with prior art leakage detection systems by a diaphragm compressor having a compressor head comprising a hydraulic fluid plate having a fluid plate contact plane and a process fluid plate having a process plate contact plane, the fluid plate and the process plate forms a compression chamber when contact between the fluid plate contact plane and the process plate contact plane is established, the compression chamber is divided in an upper chamber and a lower chamber by a multi-layered diaphragm,
- wherein a controller is configured for controlling an alternating movement of the multi-layered diaphragm towards the upper and the lower chambers respectively,
- wherein a process fluid plate seal is positioned in a process fluid seal groove provided in the contact plane, the process fluid plate seal forms a process fluid seal between an upper side of the multi-layered diaphragm and the contact plane, and
- wherein the process fluid plate comprises a process fluid leak groove system fluidly connected to a process fluid plate leakage passage provided in the process fluid plate.

This is advantageous in that it has the effect, that process fluid leaking at the seal is separated from potential leaks of hydraulic fluid making detection of leaking process fluid easier compared to detection hereof leaks of process fluid and hydraulic fluid are mixed as described in the prior art. Accordingly, the present disclosure ensures that leaking gas is not contaminated by hydraulic fluid.

The movement of the diaphragm is controlled by the controller controlling, preferably with viable speed, a motor that is driving a crankshaft connected to a piston, which via a working fluid facilitates the alternating reciprocating movement of the diaphragm towards the upper and lower chambers. Hence, the concept of establishing movement of the diaphragm and thereby compression of the process fluid is known in that art and is therefore not described in further details.

According to an exemplary embodiment, the process fluid leak groove system comprises an inner groove and an outer groove connected with a plurality of connection grooves.

This is advantageous in that it has the effect that this design allows high pressure in the chamber and still ensuring fixed position of the seal in the seal groove.

The risk of the seal being pushed out into the outer leakage groove is thereby eliminated. Accordingly, the distance between the outer groove and the seal ensures that pressure up to and even above 1000 bar in the chamber can be established at the same time as leakage can be detected.

The higher pressure required in the chamber, the larger distance between the seal groove/inner leakage groove is required in order to ensure fixation of the seal in the seal groove. However, the process and fluid plates are made of metal and the two planes are therefore flat planes of metal tightened very fast against each other making it difficult for leaked process fluid to escape without the leakage groove system. Hence, the process fluid leak groove system is advantageous in that it has the effect, that the connecting grooves and the inner groove together guides leaked process fluid to the outer groove. Thereby establishing a pathway for leaked process fluid from the seal to the process fluid plate leakage passage between or though the two planes of the process and fluid plates when these are fastened tight together.

The division of the compressor head in upper/lower head parts and process/hydraulic fluid plates is advantageous in that it has the effect, that the if anything happens to a groove or chamber, the fluid plates can be replaced and not the entire upper/lower parts of the compressor head.

According to an exemplary embodiment, the geometric shape of the compression chamber in atop view is oblong shaped.

The oblong shaped geometry is advantages in that it has the effect, that it is possible to obtain a larger chamber volume with the same material as compared to other shapes such as traditional circular shaped chambers. Hence due to increased clamping force and improved gas and heat distribution the pressure vs material volume ratio, obtained by an oblong shaped chamber is higher than with traditional circular chamber designs.

According to an exemplary embodiment, the process fluid plate and the upper head part are manufactured as one inseparable part.

According to an exemplary embodiment, the hydraulic fluid plate and the lower head part are manufactured as one inseparable part.

Having only one upper/lower head part including the process/hydraulic fluid plate contact planes and the process/hydraulic fluid leak groove systems is advantageous in that then only one upper and one lower manufacturing piece has to be designed and no additional connections between compressor head parts are need but between the upper and lower head parts.

According to an exemplary embodiment, a hydraulic fluid plate seal is positioned in a hydraulic fluid seal groove provided in the contact plane, the hydraulic fluid plate seal forms a hydraulic fluid seal between a lower side of the multi-layered diaphragm and the contact plane, and
- wherein the hydraulic fluid plate comprises a hydraulic fluid leak groove system fluidly connected to a hydraulic fluid plate leakage passage provided in the hydraulic fluid plate.

This is advantageous in that it has the effect, that hydraulic fluid leaking at the hydraulic seal is not mixed with potential leaks of process fluid making detection of leaking hydraulic fluid easier compared to detection of leaks of hydraulic fluid mixed with process fluid.

Further, an advantage of the separation of leaked hydraulic fluid and leaked process fluid is that the system volume of the of grooves in the hydraulic fluid system can be made larger than the system volume of the grooves of the process fluid system. This is advantageous in that it has the effect, that it allows effective detection of a hydraulic leak due to the lack of expansion of hydraulic fluid when it leaks. The system volume of the process fluid grooves is not as critical because the process fluid, which is typically a gas, expands significantly in volume upon decompression (leakage).

According to an exemplary embodiment, the hydraulic fluid leak groove system comprises an inner groove and an outer groove connected with a plurality of connection grooves.

The hydraulic fluid leak groove system is advantageous in that it has the effect, that the it allows high pressure in the lower chamber without risk of the hydraulic fluid seal being forced out to the outer groove. The is because the outer groove is spaced from the inner groove/seal groove by a part of the material of the hydraulic plate. The part being determined by the desired pressure in the lower chamber.

According to an exemplary embodiment, the number of connection grooves in the hydraulic fluid plate is higher than the number of the connection grooves in the process fluid plate.

This is advantageous in that it has the effect, that because the viscosity of the hydraulic fluid is higher than of the process fluid, it moves slower in the grooves than the process fluid and therefore to detect hydraulic leakage as fast or at least close to as fast as detection of process fluid leakage, the number of connections grooves in the hydraulic fluid plate has to be higher than in the process fluid plate.

According to an exemplary embodiment, the multi-layered diaphragm comprises a leak detection diaphragm positioned between a process fluid diaphragm and a hydraulic fluid diaphragm,
  wherein the leak detection diaphragm comprises one or more process side diaphragm grooves provided in the side of the leak detection diaphragm facing the process fluid diagram.

According to an exemplary embodiment, the leak detection diaphragm furthermore comprises one or more hydraulic side diaphragm grooves provided in the side of the leak detection diaphragm facing the hydraulic fluid diagram.

This is advantageous in that it has the effect, that it allows process/hydraulic fluid leaked through cracks in the respective diaphragms to escape to the process/hydraulic fluid leak groove system primarily, but not necessarily only during the intake stroke where the diaphragm is pulled downwards allowing process/hydraulic fluid to escape between the process fluid diaphragm and leakage detection diaphragms and/or between the hydraulic diaphragm and the leakage detection diaphragm.

Having a leakage detection diaphragm together with a process and/or a hydraulic fluid seal and the process side and/or hydraulic side fluid leak groove systems is advantageous in that it has the effect, that both leakage via the diaphragm and via the seal(s) can be detected. This can be done without leakages of process and hydraulic fluid is mixed.

According to an exemplary embodiment, the number of hydraulic side diaphragm grooves is higher than the number of process side diaphragm grooves.

This is advantageous in that it has the effect, that it increases the speed with which leaked hydraulic fluid with higher viscosity than process fluid can escape the volume between the leak diaphragm and the fluid diaphragm in case of a leak in the hydraulic fluid diaphragm.

According to an exemplary embodiment, the one or more process side diaphragm grooves extends between a first end and a second end,
  wherein the position of the first end is located in non-clamped part of the leak detection diaphragm, and
  wherein the position of the second end is located in the clamped part of the multi-layered diaphragm, preferably in the part of the leak detection diaphragm that is aligned with the outer groove when the compressor head is assembled.

According to an exemplary embodiment, the process fluid diaphragm comprises one or more holes wherein at least one hole is located in a position so that when the process fluid diagram and the leakage detection diaphragm is mounted and forming part of the multi-layered diaphragm, the at least one hole is aligned with the second end of one of the one or more process side diaphragm grooves and thereby configured to allow process fluid to travel from the first end via the process side diaphragm grooves to the second end and through the at least one hole into the outer groove.

According to an exemplary embodiment, the one or more hydraulic side diaphragm grooves extends between a first end and a second end,
  wherein the position of the first end is located in non-clamped part of the leak detection diaphragm, and
  wherein the position of the second end is located in the clamped part of the multi-layered diaphragm, preferably in the part of the leak detection diaphragm that is aligned with the outer groove when the compressor head is assembled.

According to an exemplary embodiment, the hydraulic fluid diaphragm comprises one or more holes wherein at least one hole is located in a position so that when the hydraulic fluid diagram and the leakage detection diaphragm is mounted and forming part of the multi-layered diaphragm, the hole is aligned with the second end of one of the one or more hydraulic side diaphragm grooves and thereby configured to allow hydraulic fluid to travel from the first end via the hydraulic side diaphragm grooves to the second end and through the hole into the outer groove.

The process side and hydraulic side grooves are advantageous in that it has the effect, that leaks of process/hydraulic fluid through the diaphragm is guided by the grooves in the leakage detection diaphragm to the holes in the process/hydraulic fluid diaphragm and through one or more of these holes. The leaked process/hydraulic fluid is then further, via one or more connection grooves, guided into the outer groove to the process/hydraulic fluid plate leakage passage. Hence, process/hydraulic fluid leaking via the diaphragm is detectable and further it is not mixed with leaked hydraulic/process fluids making detection of process/hydraulic fluid leakages possible or at least easier.

In an exemplary embodiment, the grooves in both sides of the leakage detection diaphragm takes the shortest way between the first and second ends i.e. making the travel path for leaked process/hydraulic fluid between the non-clamped part of the diaphragm to the outer groove shortest.

According to an exemplary embodiment, the process fluid plate leakage passage is fluidly connected to a process fluid leakage detection system, the process fluid leakage measurement detection system comprises a process fluid leakage conductor, a process fluid leakage valve and a process fluid leakage sensor, wherein the controller is configured to open the process fluid leakage valve periodically, and stop operation of the diaphragm compressor if the measurement received from the process fluid leakage sensor exceeds a predetermined process fluid leakage conductor threshold pressure.

According to an exemplary embodiment, the hydraulic fluid plate leakage passage is fluidly connected to a hydraulic leakage detection system, the hydraulic fluid leakage detection system comprises a hydraulic fluid leakage conductor, a hydraulic fluid leakage valve and a hydraulic fluid leakage sensor, wherein the controller is configured to open the process fluid leakage valve periodically, and stop operation of the diaphragm compressor if the measurement received from the hydraulic fluid leakage sensor exceeds a predetermined hydraulic fluid leakage conductor threshold pressure.

This is advantageous in that it has the effect, that leaked process fluid can be collected and vented at predetermined time intervals. If the pressure increases in the process or hydraulic leakage detection system above a threshold pressure between two subsequent openings of the leakage valves, a warning is set by the controller that a leakage might exist or the controller may simply stop operation of the compressor.

Periodically should be understood as a time interval between any period of time between 10 minutes and 4 hours, such as 30 minutes or 60 minutes. The time interval may be longer in the hydraulic fluid system compared to the process fluid system.

According to an exemplary embodiment, the process fluid plate leakage passage and the hydraulic fluid plate leakage passage is fluidly connected into a process and hydraulic fluid leakage detection system, configured to detect leakages from both the fluid plate leakage passage and from the hydraulic fluid plate leakage passage simultaneously.

This is advantageous in that it has the effect, that the only one detection system is needed and thereby the leakage detection system is simplified According to an exemplary embodiment, the process fluid plate leakage passage is fluidly connected to a process fluid leakage detection system,
wherein the controller is communicatively connected to the process fluid leakage valve and to the process fluid leakage sensor, and
wherein the controller is configured for controlling the status of the process fluid leakage valve in response to a measurement received from a process fluid leakage sensor.

This is advantageous in that it has the effect, that pressure established in the leakage conductor due to leaked process fluid can be monitored and vented when reaching a threshold pressure. Further, the controller is able to change mode of operation of the compressor in response to the measured leakage.

The process fluid leakage sensor is preferably a pressure sensor and is preferably part of the process fluid leakage detection system.

Communicatively connected should be understood as an analogue or digital connection facilitating communication of measurements from the sensor and control of status of the valve.

According to an exemplary embodiment, the controller is configured to keep the process fluid leakage valve closed for a predetermined process fluid period of time, and
within the predetermined process fluid period of time, compare the measured pressure of the process fluid leakage conductor with a predetermined process fluid leakage conductor threshold pressure, and
stop operation of the compressor if, within the predetermined process fluid period of time, the measured pressure exceeds the predetermined process fluid leakage conductor threshold pressure.

This is advantageous in that it has the effect, that during the period of time where the process fluid leakage valve is closed, it is possible to monitor if process fluid that is expected to leak is leaking via the leakage conductor. If the expected leakage is not registered in the leakage conductor, it may indicate that it leaks elsewhere in the compressor leak detection system. Hence by analyzing the development in the pressure increase established in the time period and correlated with operation state (e.g. start or continuous operation) of the compressor, it is possible to determine or predict if the compressor is leaking or is starting to leak from an unexpected part of the compressor leak detection system or compressor system in general.

According to an exemplary embodiment, the predetermined process fluid period of time is within the range of 10-45 minutes, preferably within 20-40 minutes and most preferably within 25-35 minutes.

According to an exemplary embodiment, the process fluid leak conductor threshold, is selected in the range of 0.1 bar to 2 bar, preferably in the range of 0.2 bar to 1 bar and most preferably in the range of 0.3 to 0.5 bar.

According to an exemplary embodiment, the controller is configured for stopping the operation of the compressor if, within the predetermined process fluid period of time, the pressure increases above an upper process fluid alarm threshold pressure.

This is advantageous in that it has the effect, that the operation of the compressor stops if pressure leaked process fluid from leaking seal or diaphragm is detected.

According to an exemplary embodiment, the upper process fluid alarm threshold pressure, is selected in the range of 0.1 bar to 2 bar, preferably in the range of 0.5 bar to 1.5 bar and most preferably in the range of 0.75 to 1.25 bar.

According to an exemplary embodiment, the controller s configured for stopping the operation of the compressor if, within the predetermined process fluid period of time, the pressure does not increase above a lower process fluid alarm threshold pressure.

This is advantageous in that it has the effect, that in this way it is detected if leaked process fluid escapes via the leakage detection system of the present disclosure and thereby if the leakage detection system is completely tight.

According to an exemplary embodiment, the lower process fluid alarm threshold pressure, is selected in the range of 0 bar to 1 bar, preferably in the range of 0.1 bar to 0.5 bar and most preferably in the range of 0.1 to 0.3 bar.

It is not unusually, that in case the process fluid is in a gaseous state e.g. is a hydrogen gas, a small and insignificant leak of process fluid at the process fluid plate seal happens at start up and/or during operation. Hence, in exemplary embodiments leak of process fluid is expected. Accordingly, in the event that the amount of leaked process fluid is known by the controller, it can be calculated how long time it takes to reach a certain determined leak threshold pressure in the process fluid leakage conductor. The process fluid leakage detection system is advantageous in that it has the effect, that the situation, where the threshold pressure is not reached within the expected time, this indicates, that something is wrong with the process fluid system. Such error could be a leakage outside the process fluid leakage detection system/ process fluid leak groove system. Further, in the situation, where the threshold pressure is reached faster than expected, this also indicates that something is wrong with the process fluid system. Such error could be a leak in the process fluid leakage detection system/process fluid leak groove system.

According to an exemplary embodiment, the process fluid leakage detection system further comprises a process fluid leakage overpressure safety valve, and
  wherein the process fluid leakage overpressure safety valve has a cracking pressure below 5 bar, preferably below 4 bar and most preferably below 2 bar.

A process fluid leakage overpressure safety valve is advantageous in that it has the effect, that if the pressure sensor, timer or process fluid leakage valve fails and the process fluid leaks, it can always escape through the overpressure safety valve when the pressure in the process fluid leakage conductor is above the cracking pressure (also sometimes referred to as opening pressure) of the overpressure safety vale (also sometimes referred to as relief vale). Typically, the overpressure safety valve is a mechanically spring type valve the load to open can be adjusted.

According to an exemplary embodiment, the hydraulic fluid plate leakage passage is fluidly connected to a hydraulic leakage detection system, the hydraulic fluid leakage detection system comprises a hydraulic fluid leakage conductor and a hydraulic fluid leakage valve,
  wherein the controller is communicatively connected to the hydraulic fluid leakage valve and hydraulic fluid leakage sensor, and
  wherein the controller is configured for controlling the status of the hydraulic fluid leakage valve in response to a measurement received from a hydraulic fluid leakage sensor.

According to an exemplary embodiment, the controller is configured to keep the hydraulic fluid leakage valve closed for a predetermined hydraulic fluid period of time, and
  within the predetermined hydraulic fluid period of time, compare the measured pressure of the hydraulic fluid leakage conductor with a predetermined hydraulic fluid leakage conductor threshold pressure, and
  stop operation of the compressor if, within the predetermined hydraulic fluid period of time, the measured pressure exceeds the predetermined hydraulic fluid leakage conductor threshold pressure.

According to an exemplary embodiment, the predetermined hydraulic fluid period of time is within the range between 3-2 hours, preferably between 2-1.5 hours and most preferably below 1.5 hours.

No hydraulic fluid is expected to leak outside the hydraulic system, hence the time period is higher than the time period used on the process fluid side. Leakage is determined if within the period of time leaked hydraulic fluid builds up a pressure exceeding the threshold pressure.

According to an exemplary embodiment, the hydraulic fluid leakage detection system further comprises a hydraulic fluid leakage overpressure safety valve, and
  wherein the process fluid leakage overpressure safety valve has a cracking pressure below 5 bar, preferably below 4 bar and most preferably below 2 bar.

The hydraulic fluid measurement system has the same effects and advantages as the process fluid measurement system.

Moreover, the disclosure relates to a method of monitoring leaked process fluid from a diaphragm compressor, wherein the process fluid plate leakage passage is fluidly connected to a process fluid leakage detection system, comprising a process fluid leakage conductor, a process fluid leakage valve and a process fluid leakage sensor. Wherein the controller is communicatively connected to the process fluid leakage valve and to the process fluid leakage sensor. Wherein the controller keeps the process fluid leakage valve closed for a predetermined process fluid period of time, and within the predetermined process fluid period of time, compare the measured pressure of the process fluid leakage conductor with a predetermined process fluid leakage conductor threshold pressure, and stop operation of the diaphragm compressor if, within the predetermined process fluid period of time, the measured pressure exceeds the predetermined process fluid leakage conductor threshold pressure.

According to an exemplary embodiment, the controller keeps the process fluid leakage valve open for 0.5-3.5 seconds before closing it again.

This period of time is advantageous in that it has the effect, that pressure built up in the process fluid leakage conductor is equalized with its surroundings. Preferably vented via a tube to a safe location. According to an exemplary embodiment, the controller stops the operation of the diaphragm compressor if, within the predetermined process fluid period of time, the pressure of the process fluid does not increase above a lower process fluid alarm threshold pressure.

According to an exemplary embodiment, the diaphragm compressor comprises a hydraulic fluid plate leakage passage fluidly connected to a hydraulic leakage detection system, the hydraulic fluid leakage detection system comprises a hydraulic fluid leakage conductor, a hydraulic fluid leakage valve and a hydraulic fluid leakage sensor. Wherein the controller is communicatively connected to the hydraulic fluid leakage valve and hydraulic fluid leakage sensor. Wherein the controller keeps the hydraulic fluid leakage valve closed for a predetermined hydraulic fluid period of time and within the predetermined hydraulic fluid period of time, compare the measured pressure of the hydraulic fluid leakage conductor with a predetermined hydraulic fluid leakage conductor threshold pressure, and stop operation of the compressor if, within the predetermined hydraulic fluid period of time, the measured pressure exceeds the predetermined hydraulic fluid leakage conductor threshold pressure.

BRIEF DESCRIPTION OF THE DRAWINGS

For a more complete understanding of this disclosure, reference is now made to the following brief description, taken in connection with the accompanying drawings and detailed description, wherein like reference numerals represent like parts. The figures all illustrate exemplary embodiments of the disclosure.

DETAILED DESCRIPTION

Figure 1:
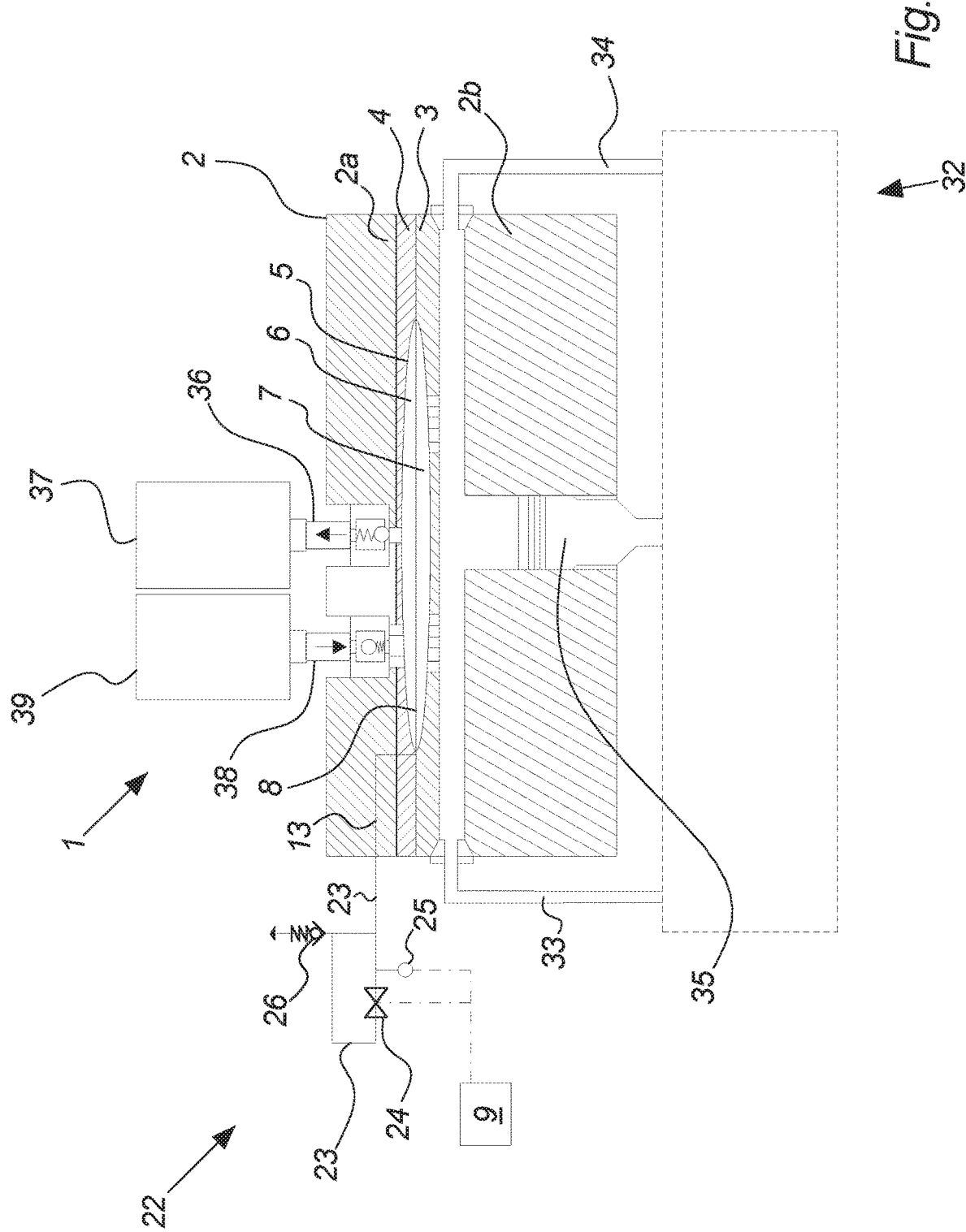
FIG. 1 illustrates a compressor.

A schematic overview of a diaphragm compressor 1 according to an exemplary embodiment of the disclosure is shown in FIG. 1.

The compressor 1 comprises an upper head part 2a and a lower head part 2b. The upper head part 2a is also referred to as a process fluid plate 4. The upper head part 2a and the process fluid plate 4 may be two separate parts (illustrated) or one single part (not illustrated). The process fluid plate 4 is having a process plate contact plane 4a. Similarly, the lower head part 2b is also referred to as a hydraulic fluid plate 3. The lower head part 2b and the hydraulic fluid plate 3 may be two separate parts (illustrated) or one single part (not illustrated). The hydraulic fluid plate 3 is having a hydraulic plate contact plane 3a. When the two head parts 2a, 2b/plates 4, 3 are attached they form a compressor head 2.

Inside the compressor head 2, the surfaces of the upper head part 2a and the lower head part 3a, respectively, together form a compression chamber 5. This chamber 5 is divided into two compartments by a multi-layered diaphragm 8 arranged in the same plane defined by planes 3a, 4a, in which the upper head part 2a and the lower head 2b are assembled to form the compressor head 2.

The compression chamber 5 comprises an upper chamber 6 and a lower chamber 7. The upper and lower chambers 6, 7 are formed in the upper/lower head parts 2a, 2b or in the process and hydraulic fluid plates 3, 4 and defined therein partly by help from the multi-layered diaphragm 8 as illustrated in FIG. 1. The upper chamber 6 is generally referred to as process fluid chamber and the lower chamber 7 is generally referred to as the hydraulic fluid chamber.

As seen from FIG. 1 a hydraulic system 32 is in fluid connection with the lower chamber 7 via hydraulic input 33 and hydraulic output 34. An electric motor is driving a piston 35 via a crankshaft and thereby the piston is pumping hydraulic fluid to and from the lower chamber 7 and thereby controlling the movement of the multi-layered diaphragm 8. Alternative methods of controlling the diaphragm exists and is known by the skilled person.

In an exemplary embodiment, the diaphragm movement is controlled as follows. When hydraulic fluid is pumped into the lower chamber 7, the diaphragm 8 is pressed towards the upper chamber 6 and the volume of the upper chamber 6 decreases. This causes the pressure of the process fluid enclosed therein to increase, and when a certain pressure has been reached, a process fluid discharge check valve 36 also referred to as outlet valve mounted in the upper head opens and releases the process fluid into a second fluid system 37 such as a second storage vessel.

When hydraulic fluid is sucked out of the lower chamber 7 at the backstroke or discharge stroke of the piston 35, the discharge valve 36 closes, the diaphragm 8 follows the hydraulic fluid level down, the volume of the upper chamber 6 increases and the pressure therein decreases. When the pressure in the upper chamber 6 has fallen below the inlet pressure of the process fluid, a process fluid inlet check valve 38 also referred to as inlet valve mounted in the upper head 2a opens and process fluid flows into the upper chamber 6 from a first fluid system 39 such as a first storage vessel as long as the hydraulic piston 35 moves back and the volume of the upper chamber 6 increases. When the hydraulic piston 35 starts moving forward again (inlet stroke), the inlet valve 38 closes, and the cycle is repeated.

The first fluid system 39 may be a gaseous fluid system such as a hydrogen storage system having a pressure of e.g. 20-50 MPa and the second fluid system 37 may also be a gaseous fluid storage such as a hydrogen storage system having a pressure of e.g. 50-100 MPa. The first fluid system 39 may be part of a hydrogen refuelling station such as a supply storage and the second fluid system 37 may be a hydrogen storage of a vehicle or of the refuelling station.

FIG. 1 further illustrates the external part of a process fluid leakage detection system 22 which serves the purpose of detecting if any of the process fluid leaks from the chamber 5. The leakage detection system 22 may be implemented as a combination of valves 24, 26 and a sensor 25. No matter how fluid escapes the chamber 5 it is preferred that the leakage detection system 22 detects it. Alternatively, more than one leakage detection system 22 are used. The systems may be substantially identical. It should be noted, that the illustrated hydraulic system 32 may include additional components than what is illustrated on FIG. 1.

The compressor 1 and measurement system 22 may be connected to and controlled by the same controller 9. The controller 9 may be a standard industrial controller typically in the art referred to as a programmable logic controller (PLC).

Figure 2:
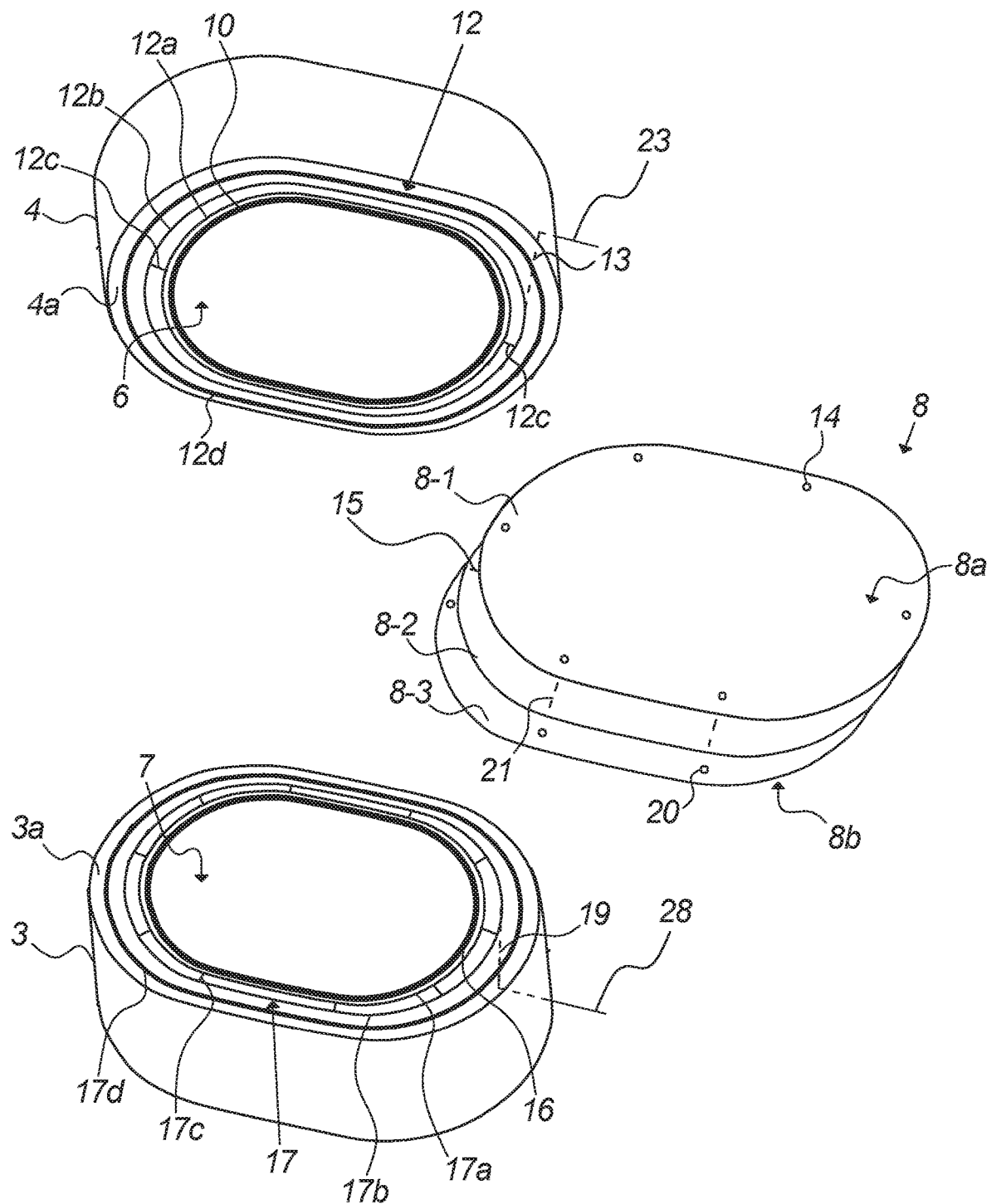
FIG. 2 illustrates a process fluid plate, a hydraulic fluid plate and a multi-layered diaphragm.

FIG. 2 illustrates an exemplary embodiment of the disclosure where the compressor comprises a replaceable hydraulic fluid plate 3 and a process fluid plate 4 and a multi-layered diaphragm 8.

The hydraulic and process fluid plates 3, 4, are as mentioned, in this embodiment mounted to the upper and lower head part 2a, 2b respectively. The two head parts 2a, 2b are preferably connected to each other and to the fluid plates 3, 4 by means of bolts and nuts/thread. Hence, in the circumference of the fluid plates 3, 4, a series of not illustrated holes would be present to facilitate this way of fastening, the bolt hole 40 are illustrated on FIG. 3, 4a and 4b.

The upper chamber 6 is defined by the process fluid plate seal 10 when the seal 10 is pressed against the diaphragm 8. The seal 10 is positioned in a not illustrated seal groove. If for some reason the seal is leaking, the process fluid enters the inner groove 12a of the process fluid leak groove system 12. From this inner groove 12a, the leaked process fluid follows the connection grooves 12c to the outer groove 12b and further follows the outer groove 12b to the process fluid plate leakage passage 13. From there, the leaked process fluid enters the process fluid leakage conductor 23 which will be explained in further details with reference to FIG. 5.

The reason for having an inner and an outer groove 12a, 12b is to ensure strength enough in the construction of the process fluid plate to facilitate a pressure of 1000 bar in the upper chamber 6. In a non-limiting example, the distance between the inner and outer grooves 12a, 12b is less than 10 millimeters, preferably between 5 and 10 millimeters.

As illustrated on the hydraulic fluid plate 3, if detection of hydraulic fluid leakage is required, it can be done by the same principles as described above with reference to the process plate 4. The hydraulic fluid plate 3 may also comprise a not illustrated seal groove in which a hydraulic fluid plate seal 16 is positioned. Right next to the seal 16 outwards, an inner groove 17a is established in the hydraulic fluid plate 3. Hydraulic fluid leaked at the seal 16 end in the inner groove 17a where it is guided via connection grooves 17c and the outer groove 17b to the hydraulic fluid plate leakage passage 19.

The volume/size of the outer groove 17b is preferably larger than the volume/size of the outer groove 12b. The volume/of the grooves in the systems 12, 17 should be large enough to conduct leaked fluid and maintain strength of the construction. The larger volume, the longer time it takes to pressurize the volume and the longer time it takes to detect a leakage. On the other hand, the volumes should be large enough to let the leaked fluid pass through i.e. the volume of the hydraulic grooves may be larger than the process grooves.

In addition, to the above, the process and hydraulic fluid plates 3, 4 may include a leakage seal groove and associate leak seal. This leak seal arrangement 12d, 17d is implemented to ensure that leaked process/hydraulic fluid only is allowed to escape via the outer grooves 12c, 17c and the process/hydraulic leak measurement systems 22, 27.

The principles of the above described seal leakage guiding systems i.e. the hydraulic and process fluid leak groove systems 12, 17 are the same only dimensions of spaces and grooves may differ. The distance and grooves may be designed to particular fluids such as hydrogen (process fluid) and hydraulic oil (hydraulic fluid). One difference that may exist between the two plates 3, 4 is the number of connection grooves 12c and 17c. As illustrated, on the hydraulic fluid plate 3 the distribution or density of connection grooves 17c is higher than in the process fluid plate 4. The reason of the higher number of connection grooves 17c is that e.g. hydrogen gas needs less space to spread quickly compared to thicker hydraulic oil.

On FIG. 2, a multi-layered diaphragm 8 having three layers 8-1, 8-2, 8-3 is illustrated according to an exemplary embodiment. In principle the compressor 1 could be functioning with a one layered diaphragm, however then the leakage detection system of the present disclosure could not be made. Leakages caused by a defect diaphragm and trapped between the diaphragms 8-1, 8-2, 8-3 are guided to the monitoring systems 22, 27 as follows.

The process fluid diaphragm 8-1 may be developed to a particular process fluid i.e. the material or coating of the diaphragm material may be determined by the type of process fluid to be handled by the compressor 1. The same is true for the hydraulic fluid diagram 8.2. The middle diaphragm, the so-called leakage detection diaphragm 8-3 is specifically designed and used to ensure separation of the process and hydraulic fluids in case of one or both leaks from their respective chambers 6, 7. Further, the leakage diaphragm is designed to guide leaked fluid from the center towards the edge as will be described.

Figure 4A:
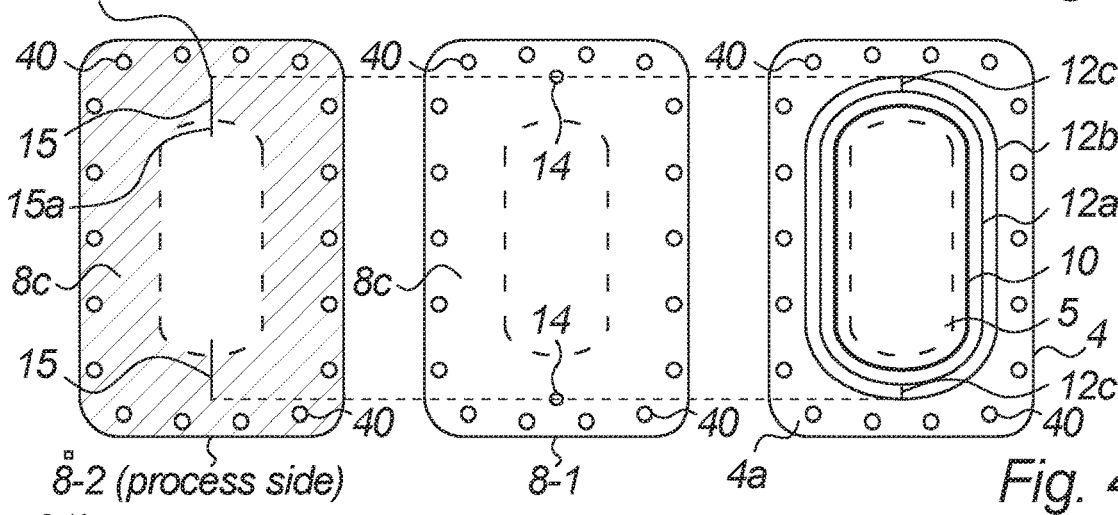
FIG. 4a illustrates a detailed view of a process fluid plate and associated diaphragms.
Figure 4B:
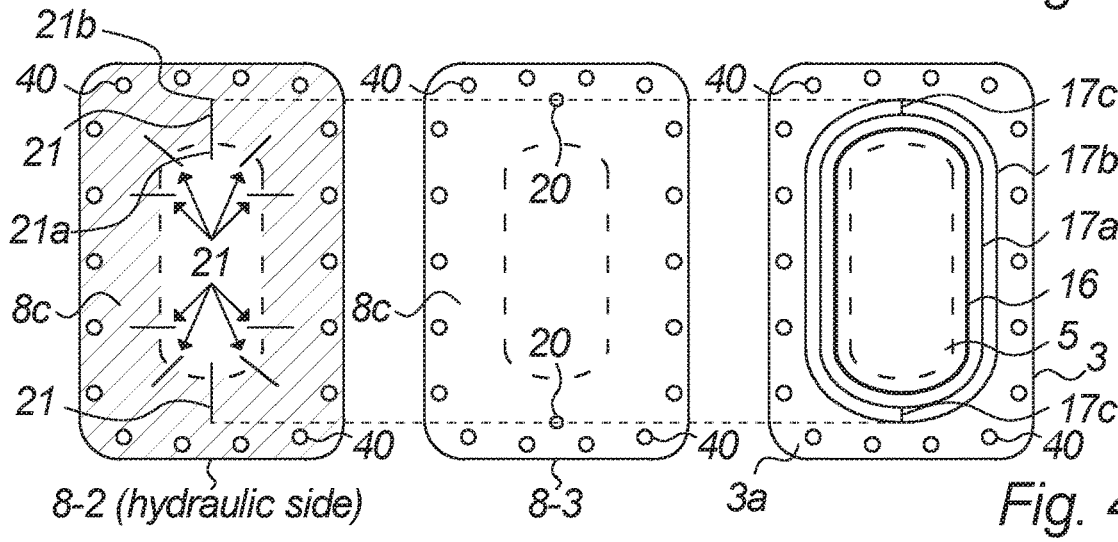
FIG. 4b illustrates a detailed view of a hydraulic fluid plate and associated diaphragms.

As indicated and described further with respect to FIGS. 4a and 4b, grooves or scores are established on both sides (process 15 and hydraulic side 21) of the leak detection diaphragm 8-3. Process/hydraulic fluids leaking via the process/hydraulic diaphragms 8-1, 8-3 respectively are guide from a first end 15a, 21a of a score 15, 21 located in the non-clamped part of the diaphragm 8c to a second end 15b, 21b of the score located in the clamped part of the diaphragm 8c. Typically, the leaked fluid is pushed from the first end 15a, 21a through the clamped part of the diaphragm 8c via the score 15, 21 to the second end 15b, 21b during a discharge stroke of the piston 35. However, fluid may also leak during intake strokes and while the compressor is not in operation.

The number of diaphragm grooves 15, 21 may not be the same in that the process fluid typically is a gas which travels faster than a hydraulic fluid. Further, the number of diaphragm grooves do not have the match the number of connection grooves 12c, 17c.

As illustrated on FIG. 2, the process/hydraulic fluid diaphragms 8-1, 8-3 are equipped with holes 14, 20. When the three diaphragm layers 8-1, 8-2, 8-3 are put on top of each other the holes 14 and the second ends 15b are aligned and the holes 20 and the second ends 21b are aligned. Further, the holes 14, 20 are aligned with the outer grooves 12c, 17c so fluid leaked through the diaphragms 8-1, 8-3 is guided towards the outer grooves 12c, 17c at least during a discharge stroke. The diameter of the holes 14, 21 are preferably smaller than the width of the outer grooves 12b, 17b measured in the plans 3a, 4a to ensure leaked fluid has easy passage to the outer grooves 12b, 17b.

In FIG. 2, the hydraulic side diaphragm grooves 21 are illustrated by stipulated lines in that they are made in the side of the leakage diaphragm 8-2 facing downward towards the hydraulic plate 3. The process side diaphragm grooves 15 are illustrated by solid lines in that they are made in the side of the leakage diaphragm 8-2 facing upwards towards the process plate 4.

From the outer grooves 12c, 17c, the leaked fluid enters the process/hydraulic fluid plate leakage passages 13, 19 respectively and via these passages enters the process/hydraulic fluid leakage detection systems 22, 27 respectively.

As illustrated, the plates 3, 4 may also include leak seal arrangements 12d, 17d. These leak seal arrangements 12d, 17d are in an exemplary embodiment implemented as a groove in which a seal is positioned. The purpose of the leak seal arrangements 12d, 17d is to ensure that leaked fluid escapes the compressor head 2 via the plate leakage passages 13, 19.

Figure 3:
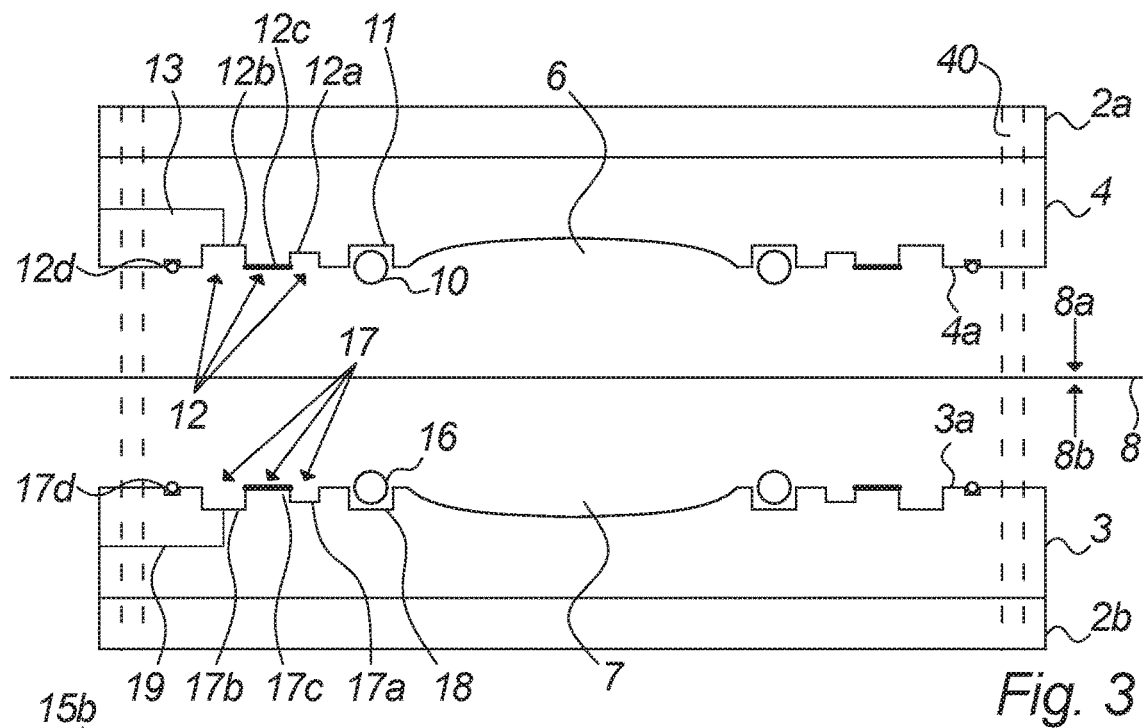
FIG. 3 illustrates a cross-sectional view of a process fluid plate, a hydraulic fluid plate and a multi-layered diaphragm.

FIGS. 3 (cut-through view of the plates 3, 4 at a location including the non-clamped part of the diaphragm 8-3), 4a (view towards the process plate 4) and 4b (view towards the hydraulic plate 3) illustrates the leak groove systems 12, 17 in further details. Because the leak groove systems 12, 17 are identical only the process fluid leak groove system 12 is described in the following, the hydraulic fluid leak groove system 17 works similar and is designed based on the same principles.

The plates 3, 4 may be connected by bolt, the bolt holes 40 of which are illustrated on FIG. 3, 4a and 4b.

Leakages from a defect seal 10, 16 are guided to the process/hydraulic fluid leakage detection systems 22, 27 via the outer grooves 12c, 17c. As illustrated in the exemplary embodiment of FIG. 3, the process and hydraulic fluid plates 3, 4 includes similar leak groove systems 12, 17. In the embodiment, where only leakages of process fluid are relevant to monitor, only the leak groove system 12 is necessary and vice versa. When leakage detection of both process and hydraulic fluids are needed the present disclosure is advantageous in that separation of the two types of leaked fluids are facilitated.

Right next to the seal 10 outwards an inner groove 12a is established in the plate 4. The inner groove 12a and the connection grooves 12c should only be large enough to be able to guide leaked fluid to the outer groove 12b The connection grooves 12c are used to guide leaked fluid from the inner groove 12a into the outer groove 12b.

Generally, the grooves are as small as possible to hold an appropriate seal and to form sufficient passage for leaked fluid in order to maintain as much strength in the plates 3, 4 as possible.

It should be noted, that in an exemplary embodiment, the number of connection grooves 17c in the hydraulic fluid plate 3 is higher than the number of connection grooves 12c in the process fluid plate 4. This is due to the fact that the hydraulic fluid has a higher viscosity than the process fluid and therefore needs additional paths to increase speed with which it escapes into the outer groove 17b.

Note that even though the figures illustrate an oblong shaped chamber 5, the present disclosure could be implemented having the same advantages on a compressor having circular chamber.

FIG. 4a illustrates the process plate 4 in a top view, the process side of the leakage diaphragm 8-2 i.e. the side facing the process plate 4 when the compressor head is assembled and the process fluid diaphragm 8-1. Only the coating may be different from the two sides of the process fluid diaphragm 8-1. The stipulated line inside the seal 10 indicates where the clamped part of the multi-layered diaphragm 8c stops. Hence from the stipulated line and outwards, the multi-layered diaphragm 8 is clamped between the two plates 3, 4. The bolts used to clamp the diaphragm 8 between the two plates 3, 4 may pass through bolt holes 40 provided both in the plates 3, 4 and in all the diaphragms 8-1. 8-2 and 8-3.

To reduce the number of parts, the process and hydraulic fluid diaphragms 8-1, 8-3 can be made of the same material and possibly coated different according to their use as process or hydraulic fluid diaphragms 8-1, 8-3. Therefore, the number of holes 14, 20 in the two diaphragms may be the same even though not all are used in the process diaphragm.

From FIG. 4a, it is illustrated, that the first end of the process side diaphragm groove 15a starts in the process side of the leakage diaphragm 8-2 in the non-clamped part hereof. This has the effect, that process fluid leaked through a crack in the diaphragm 8-1 e.g. during an intake stroke, when the leakage diaphragm 8-2 and the process fluid diaphragm separates a bit, can enter the process side diaphragm groove 15 during the subsequent discharge stroke.

The second end of the process side diaphragm groove 15b is as illustrated aligned with the outer groove 12b so that through the clamped part of the diaphragm 8c and holes 14, leaked fluid can travel through the groove 15 to the outer groove 12b.

Note that the hatched part of the leak diaphragm 8-2 is the clamped part of the leak diaphragm 8c and hence on this illustration when the layers of the diaphragm 8-1 and 8-2 are assembled the layers are assembled so that the stipulated lines are placed on top of each other.

FIG. 4b illustrates the hydraulic plate 3 in a top view, the hydraulic side of the leakage diaphragm 8-2 i.e. the side facing the hydraulic plate 3 when the compressor is assembled and the hydraulic fluid diaphragm 8-3. Only the coating may be different from the two sides of the hydraulic fluid diaphragm 8-3. As described with reference to FIG. 4a, the hatched part of the leakage diaphragm 8-2 is the clamped part of the diaphragm 8c. The hydraulic fluid side diaphragm grooves are also as described starting at a first end 21a in the non-clamped part and ends aligned with the outer groove 17b at its second end 21b. Thereby, hydraulic fluid leaked through a crack in the hydraulic fluid diaphragm 8-3 can escape as described above to the hole 21 and outer groove 17b.

It is noted that only two process sides grooves 15 and ten hydraulic side grooves 21 are illustrated. This only served the purpose of illustrating the number grooves 15, 21 on each side of the leakage diaphragm 8-3 does not have to be the same.

Hence, 3, 4, 5, 6-10 grooves 15 can be used on the process side and 2-20 and any number therebetween of grooves 21 can be used without compromising the principles of the present disclosure.

Figure 5:
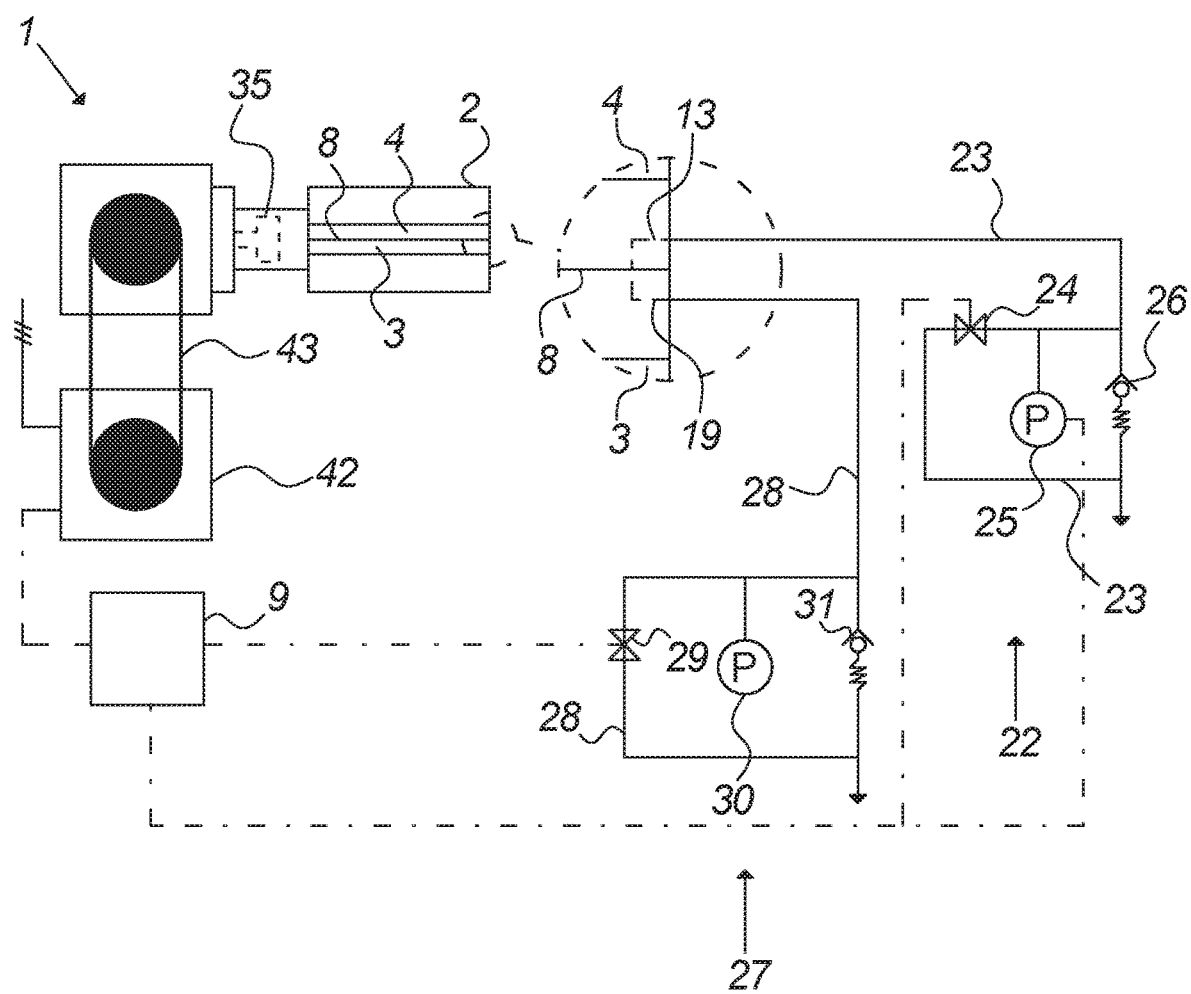
FIG. 5 illustrates leakage detection systems.

FIG. 5 illustrates a very simplified compressor 1 comprising an electric motor 42 driving the piston 35 by means of a belt 43. The leakage detection system of the present disclosure can be implemented on other configurations and designs of the compressor 1 than what is illustrated in the figures. In the circle defined by the stipulated line, the process fluid plate leakage passage 13 and hydraulic fluid plate leakage passage 19 is illustrated as being connected to process fluid leakage conductor 23 and hydraulic fluid leakage conductor 28 respectively.

The passages 13, 19 are established in the material of the plates 3, 4 (or upper/lower head parts if no replaceable plates are included in the compressor design) whereas the conductors 23, 28 may be any type of piping including flexible plastic or metal pipes. The measurements systems 22, 27 are based on the same principles and therefore only the process fluid leakage detection system 22 is described.

Beside the leakage conductor 23, the process fluid leakage detection system 22 comprises a leakage valve 24, leakage sensor 25 and leakage overpressure safety valve 26.

The purpose of the overpressure safety valve 26 is to ensure that if the pressure in the measurement system 22 increases to and above a overpressure safety valve threshold, the overpressure safety valve 26 opens and the pressure is reduced i.e. the measurement system is protected from failure e.g. in control of the valve 24. Even though not illustrated, the overpressure safety valve 26 may communicate with the controller 9 e.g. to inform the controller 9, that the overpressure safety valve 26 has been activated.

The status of the process fluid leakage valve 24 is preferably determined by a timer of the controller 9. Upper and lower process fluid alarm threshold pressures are defined and during a predetermined process fluid period of time, the controller 9 compares the pressure readings received from the sensor 25 with the upper and lower threshold pressures.

In an exemplary embodiment, the predetermined process fluid period of time is set to 30 minutes, the upper process fluid alarm threshold pressure is set to 0.9 bar and the lower process fluid alarm threshold pressure is set to 0.2 bar. The valve 24 is not opened within the 30 minutes and if the pressure in the conductor 23 does not exceed the lower threshold of 0.2 bar within the 30 minutes, an alarm is set. Similarly, if the pressure within the 30 minutes increases above the upper threshold of 0.9 bar, an alarm is also set.

Alternatively, the time before an alarm is triggered due to lower pressure than the lower process fluid alarm threshold can be set to several hours e.g. between 1 and 5 hours. As an example, if no pressure reading above 0.2 has been made by the sensor 25 for a period of 3 hours, a warning may be provided. Then, if not pressure reading above 0.2 bar has been made for a period of another 3 hours, an alarm may be provided.

Note that the first time the, the valve 24 change status to open, after starting up the compressor, could be initiated by a pressure reading between the two alarm thresholds i.e. 0.2 bar and 0.9 bar. The valve 24 could be opened e.g. in 2 seconds.

The reason for not reaching the lower threshold within the time period could be, that process fluid is leaking outside the leakage detection system. The reason for increasing the upper threshold within the time period could be, that either the seal or the diaphragm is leaking. In any case, the controller may react on the alarm by changing mode of operation preferably to perform a safe shutdown of the compressor.

Parallel to this, the leakage detection system 22 comprises an overpressure safety valve 26. The overpressure safety valve 26 may be implemented as a mechanical spring-loaded relief type valve having an adjustable threshold pressure for when to open for flow through the overpressure safety valve 26 i.e. the overpressure safety valve would then be a normally closed valve opening at a pressure of e.g. 2 bar, 3 bar, 4 bar, 5 bar or even higher. This is advantageous in that it has the effect, that if the process fluid leak continues e.g. at each cycle of the diaphragm, the pressure in the conductor 23 will increase only to it reaches the predetermined overpressure safety valve threshold pressure. Hence, the overpressure safety valve 26 ensures safety of the process leak detection system of the diaphragm compressor.

Opening the process leak valve 24 in response to a pressure signal from the process leak sensor 25 is advantageous in that it has the effect, that it is ensured, that the process leak sensor 25 or process leak valve 24 is not failing. Hence, if the pressure continues to increase above the upper alarm threshold value, it indicates that something is wrong e.g. the gas leakage valve may be failing.

Accordingly, the diaphragm compressor 1 of the present disclosure is expected to leak some small quantity of process fluid during operation which is monitored by the process leak sensor 25. Hence, if this pressure in the leakage conductor 23 is not increasing during operation including stat-up it indicates that the leakage detection system is compromised i.e. the ability to seal pressure within the leakage detection is compromised. In any event appropriate actions can be taken such as stopping the operation of the diaphragm compressor via the controller 9.

Accordingly, the pressure leakage detection system 22 of the present disclosure is advantageous in that it is able to detect leakage from the process seal 10, the diaphragm 8-1 and monitor if the compressor including the leakage detection system 22 is tight. Furthermore, the leakage detection system 22 and the design of seals and grooves are advantageous in that it together it constitutes a leakage detection system design that is tight and able to maintain seal integrity and seal pressure in the chambers/in the leakage detection system.

The hydraulic fluid leakage detection system 27 is as mentioned similar to the process leakage detection system 22. With this said, since no leaking of hydraulic fluid is expected, so the control and monitoring is not completely the same. In an exemplary embodiment, the valve 29 may open for the first time when a pressure of e.g. 0.2 bar is reached. The valve 29 may be open for e.g. 2 seconds. Then a time period of e.g. 1 hour passes in which the valve 29 is not allowed to open. If, in this time period, the pressure reaches e.g. 0.4 bar, the valve is opened, and an alarm is activated. Typically, in this situation, the controller 9 will react on such alarm by initiate a safe stop of the operation of the compressor.

The leakage detection system 27 also comprises an overpressure safety valve 31, which serves the same purpose as the overpressure safety valve 26 described above. The opening pressure may be different or the same as that of the overpressure safety valve 26.

An advantage of the separation of two leakage detection systems described above is that the hydraulic system volume (volume in the grooves 17) can be smaller which allows effective detection of a hydraulic leak due to the lack of expansion of hydraulic fluid when it leaks. The process system volume (volume in grooves 12) is not as critical because the process fluid which is typically a gas expands significantly in volume upon decompression (leakage). Therefore, a larger process system volume may be preferred for process fluid leak detection.

Beside the advantage of being able to separate leakages of process fluid from hydraulic fluid and vice versa, the present disclosure is advantages in that by the above describe compressor and measurement system, the controller 9 is able to determine if the leakage groove systems 12, 17 and measurement systems 22, 27 are failing. This is at least true for the process leakage groove system 12 and for the process measurement system 22. Failing could be understood as having a leak which is not measure by the measurement system 22 i.e. if e.g. the leak seal arrangement 12d are leaking.

Since a certain leakage is expected via the process plate seal 10, at least each time the compressor starts up, a certain pressure increase is expected in the conductor 23. If no pressure increase is detected within a given period of time, this is an indication that a leak is happening which is not caught by the leak groove system 12 or by the measurement system 22.

Similarly, since a leakage of a certain size is expected within a certain period of time, then if for some reason the pressure increase in the conductor 23 due to a leak increases more than expected within a certain period time, it is an indication that either the seal 10 or the diaphragm 8-1 is leaking.

Figure 6:
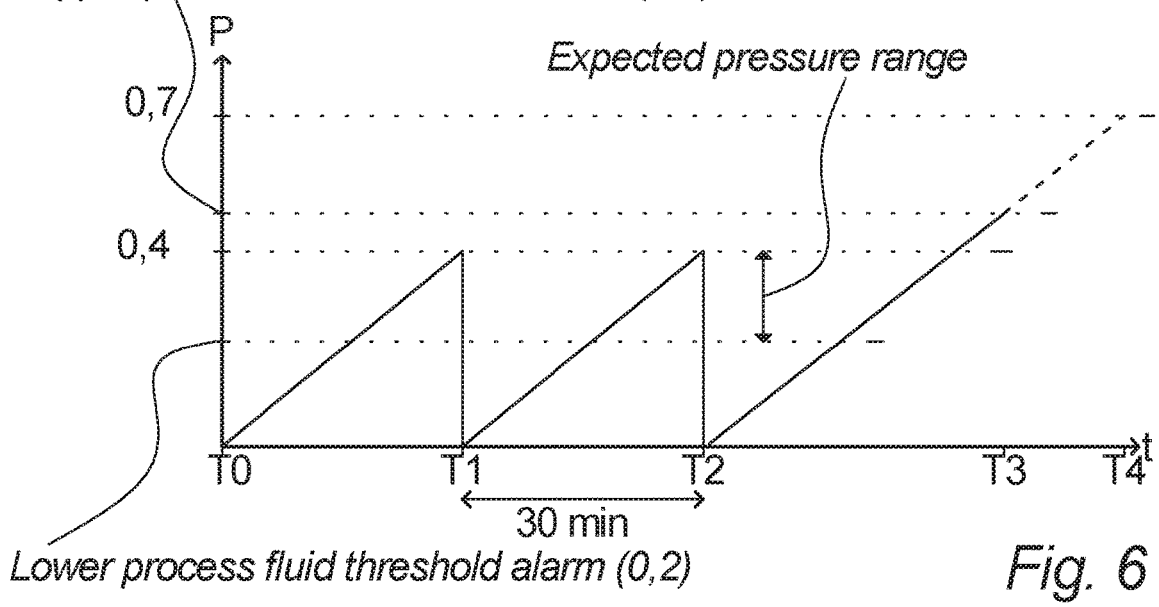
FIG. 6 illustrates an expected process fluid leakage curve.

An example of expected pressure increases in the conductor 23 caused by expected leaking process fluid is illustrated on FIG. 6. With reference to the above exemplary embodiment, at time T0 the compressor is started and reaching 0.4 bar at time T1. Then valve 24 opens, reducing the pressure which starts to build up again. At time T2, 30 minutes has passed since last opening at time T1. At time T3, the pressure in the conductor 23 increases above 0.9 bar and the controller stops the compressor. If this is not the case, the pressure increases to 1.7 bar at T4, where the overpressure safety valve 26 opens and reduces the pressure.

Finally, in case the process leakage detection system 23 does not comprise a pressure sensor 25, it is possible to perform an alternative leakage detection by means of a timer. Hence, a timer of the controller may be used as trigger for the opening and closing of the process fluid leakage valve e.g. every 30 minutes. In this case however, the valve opens no matter if there has been a leakage or not. The drawback of this approach is that it is not possible to determine if the system is completely sealed/tight. This is because it is expected to leak a bit of process fluid e.g. during start up and it cannot in this way be detected if this expected leakage escapes via the leakage detection system or via a leak elsewhere on the compressor. Hence it is not, as possible in the present disclosure, possible to detect a leakage trend i.e. to spot if the compressor is leaking a bit and the evolution of such leakage. The same alternative is available for the hydraulic fluid side.

From the above description it is now clear that the present disclosure relates to a leakage detection system for a diaphragm compressor 1. A leakage of process fluid is not mixed with a leakage of hydraulic fluid making the leakage easier to detect compared to the situation where leaked process fluid and hydraulic fluid are mixed. Hence the present disclosure is a non-contaminated system where process fluid is not contaminated with hydraulic fluid if a leak event occurs.

A leak through a crack in a diaphragm is guided from the crack to the outer groove 12b, 17b via a groove 15, 21 in the leak diaphragm 8-2 to a hole 14, 20 in the respective diaphragm 8-1 and/or 8-2. A leak via the seal 10, 16 will enter the inner groove 12a, 17a and via the connection grooves 12c, 17c end in the outer groove 12b, 17b.

From the outer groove 12b, 17b, the leaked fluid is guided via a leakage passage 13, 19 to a leak measurement system 22, 28 where the leakage is monitored by a controller. The monitoring is facilitated by a pressure sensor 25, 30 measuring the pressure in a leak conductor 23, 28. The measured pressure is, preferably by the controller, compared to an expected pressure leak range defined by an upper and a lower pressure threshold. If the measured pressure is outside the expected pressure leak range, something may be wrong, and the controller would stop the operation of the compressor.

Hence, the advantages are that leaks are separated for easier measurement and it is detected if no leaks are measured and if leaks above a leak threshold is measured.

The invention claimed is:

1. A diaphragm compressor, comprising
a compressor head comprising a hydraulic fluid plate having a fluid plate contact plane and a process fluid plate having a process plate contact plane, the hydraulic fluid plate and the process fluid plate forms a compression chamber when contact between the fluid plate contact plane and the process plate contact plane is established, the compression chamber is divided in an upper chamber and a lower chamber by a multi-layered diaphragm,
wherein a controller is configured for controlling an alternating movement of the multi-layered diaphragm towards the upper and the lower chambers respectively,
wherein a process fluid plate seal is positioned in a process fluid seal groove provided in the process plate contact plane, the process fluid plate seal forms a process fluid seal between an upper side of the multi-layered diaphragm and the process plate contact plane,
wherein the process fluid plate comprises a process fluid leak groove system fluidly connected to a process fluid plate leakage passage provided in the process fluid plate, and
wherein the process fluid leak groove system comprises an inner groove and an outer groove connected with a plurality of connection grooves.

2. A diaphragm compressor according to claim 1, wherein a geometric shape of the compression chamber in a top view is oblong shaped.

3. A diaphragm compressor according to claim 1, wherein a hydraulic fluid plate seal is positioned in a hydraulic fluid seal groove provided in the fluid plate contact plane, the hydraulic fluid plate seal forms a hydraulic fluid seal between a lower side of the multi-layered diaphragm and the fluid plate contact plane, and
wherein the hydraulic fluid plate comprises a hydraulic fluid leak groove system fluidly connected to a hydraulic fluid plate leakage passage provided in the hydraulic fluid plate.

4. A diaphragm compressor according to claim 3, wherein the hydraulic fluid leak groove system comprises an inner groove and an outer groove connected with a plurality of connection grooves.

5. A diaphragm compressor according to claim 1, wherein the multi-layered diaphragm comprises a leak detection diaphragm positioned between a process fluid diaphragm and a hydraulic fluid diaphragm,
wherein the leak detection diaphragm comprises one or more process side diaphragm grooves provided in the side of the leak detection diaphragm facing the process fluid diagram.

6. A diaphragm compressor according to claim 5, wherein the leak detection diaphragm furthermore comprises one or more hydraulic side diaphragm grooves provided in the side of the leak detection diaphragm facing the hydraulic fluid diagram.

7. A diaphragm compressor according to claim 5, wherein the process fluid diaphragm comprises one or more holes wherein at least one hole is located in a position so that when the process fluid diagram and the leakage detection diaphragm are mounted and forming part of the multi-layered diaphragm, the at least one hole is aligned with a second end of one of the one or more process side diaphragm grooves and thereby configured to allow process fluid to travel from a first end via the process side diaphragm grooves to the second end and through the at least one hole into the outer groove.

8. A diaphragm compressor according to claim 1, wherein the hydraulic fluid diaphragm comprises one or more holes wherein at least one hole is located in a position so that when the hydraulic fluid diagram and the leakage detection diaphragm are mounted and forming part of the multi-layered diaphragm, the hole is aligned with a second end of one of the one or more hydraulic side diaphragm grooves and thereby configured to allow hydraulic fluid to travel from a first end via the hydraulic side diaphragm grooves to the second end and through the hole into the outer groove.

9. A diaphragm compressor according to claim 1, wherein the process fluid plate leakage passage is fluidly connected to a process fluid leakage detection system, the process fluid leakage detection system comprises a process fluid leakage conductor, a process fluid leakage valve and a process fluid leakage sensor, wherein the controller is configured to open the process fluid leakage valve periodically, and stop operation of the diaphragm compressor if the measurement received from the process fluid leakage sensor exceeds a predetermined process fluid leakage conductor threshold pressure.

10. A diaphragm compressor according to claim 3, wherein the hydraulic fluid plate leakage passage is fluidly connected to a hydraulic leakage detection system, the hydraulic fluid leakage detection system comprises a hydraulic fluid leakage conductor, a hydraulic fluid leakage valve and a hydraulic fluid leakage sensor, wherein the controller is configured to open the hydraulic fluid leakage valve periodically, and stop operation of the diaphragm compressor if a measurement received from the hydraulic fluid leakage sensor exceeds a predetermined hydraulic fluid leakage conductor threshold pressure.

11. A diaphragm compressor according to claim 3, wherein the process fluid plate leakage passage and the hydraulic fluid plate leakage passage are fluidly connected into a process and hydraulic fluid leakage detection system, configured to detect leakages from both the process fluid plate leakage passage and from the hydraulic fluid plate leakage passage simultaneously.

12. A diaphragm compressor according to claim 9, wherein the process fluid plate leakage passage is fluidly connected to the process fluid leakage detection system, wherein the controller is communicatively connected to the process fluid leakage valve and to the process fluid leakage sensor, and wherein the controller is configured for controlling the status of the process fluid leakage valve in response to a measurement received from the process fluid leakage sensor.

13. A diaphragm compressor according to claim 9, wherein the controller is configured to keep the process fluid leakage valve closed for a predetermined process fluid period of time, and within the predetermined process fluid period of time, compare a measured pressure of the process fluid leakage conductor with the predetermined process fluid leakage conductor threshold pressure, and stop operation of the compressor if, within the predetermined process fluid period of time, the measured pressure exceeds the predetermined process fluid leakage conductor threshold pressure.

14. A diaphragm compressor according to claim 10, wherein the hydraulic fluid plate leakage passage is fluidly connected to the hydraulic leakage detection system, wherein the controller is communicatively connected to the hydraulic fluid leakage valve and the hydraulic fluid leakage sensor, and wherein the controller is configured for controlling a status of the hydraulic fluid leakage valve in response to a measurement received from the hydraulic fluid leakage sensor.

15. A diaphragm compressor according to claim 10, wherein the controller is configured to keep the hydraulic fluid leakage valve closed for a predetermined hydraulic fluid period of time, and within the predetermined hydraulic fluid period of time, compare a measured pressure of the hydraulic fluid leakage conductor with a predetermined hydraulic fluid leakage conductor threshold pressure, and stop operation of the compressor if, within the predetermined hydraulic fluid period of time, the measured pressure exceeds the predetermined hydraulic fluid leakage conductor threshold pressure.

16. A method of monitoring leaked process fluid from a diaphragm compressor according to claim 1, wherein the process fluid plate leakage passage is fluidly connected to a process fluid leakage detection system, comprising a process fluid leakage conductor, a process fluid leakage valve and a process fluid leakage sensor, wherein the controller is communicatively connected to the process fluid leakage valve and to the process fluid leakage sensor, the method comprising:
the controller keeping the process fluid leakage valve closed for a predetermined process fluid period of time, and
within the predetermined process fluid period of time, comparing the measured pressure of the process fluid leakage conductor with a predetermined process fluid leakage conductor threshold pressure, and
stopping operation of the diaphragm compressor if, within the predetermined process fluid period of time, the measured pressure exceeds the predetermined process fluid leakage conductor threshold pressure.

17. The method according to claim 16, wherein the controller stops the operation of the diaphragm compressor if, within the predetermined process fluid period of time, the pressure of the process fluid does not increase above a lower process fluid alarm threshold pressure.

18. The method according to claim 16, wherein the diaphragm compressor comprises a hydraulic fluid plate leakage passage fluidly connected to a hydraulic leakage detection system, the hydraulic fluid leakage detection system comprises a hydraulic fluid leakage conductor, a hydraulic fluid leakage valve and a hydraulic fluid leakage sensor, wherein the controller is communicatively connected to the hydraulic fluid leakage valve and hydraulic fluid leakage sensor, and wherein the controller keeps the hydraulic fluid leakage valve closed for a predetermined hydraulic fluid period of time and within the predetermined hydraulic fluid period of time, compare the measured pressure of the hydraulic fluid leakage conductor with a predetermined hydraulic fluid leakage conductor threshold pressure, and stop operation of the compressor if, within the predetermined hydraulic fluid period of time, the measured pressure exceeds the predetermined hydraulic fluid leakage conductor threshold pressure.

* * * * *